UNITED STATES PATENT OFFICE.

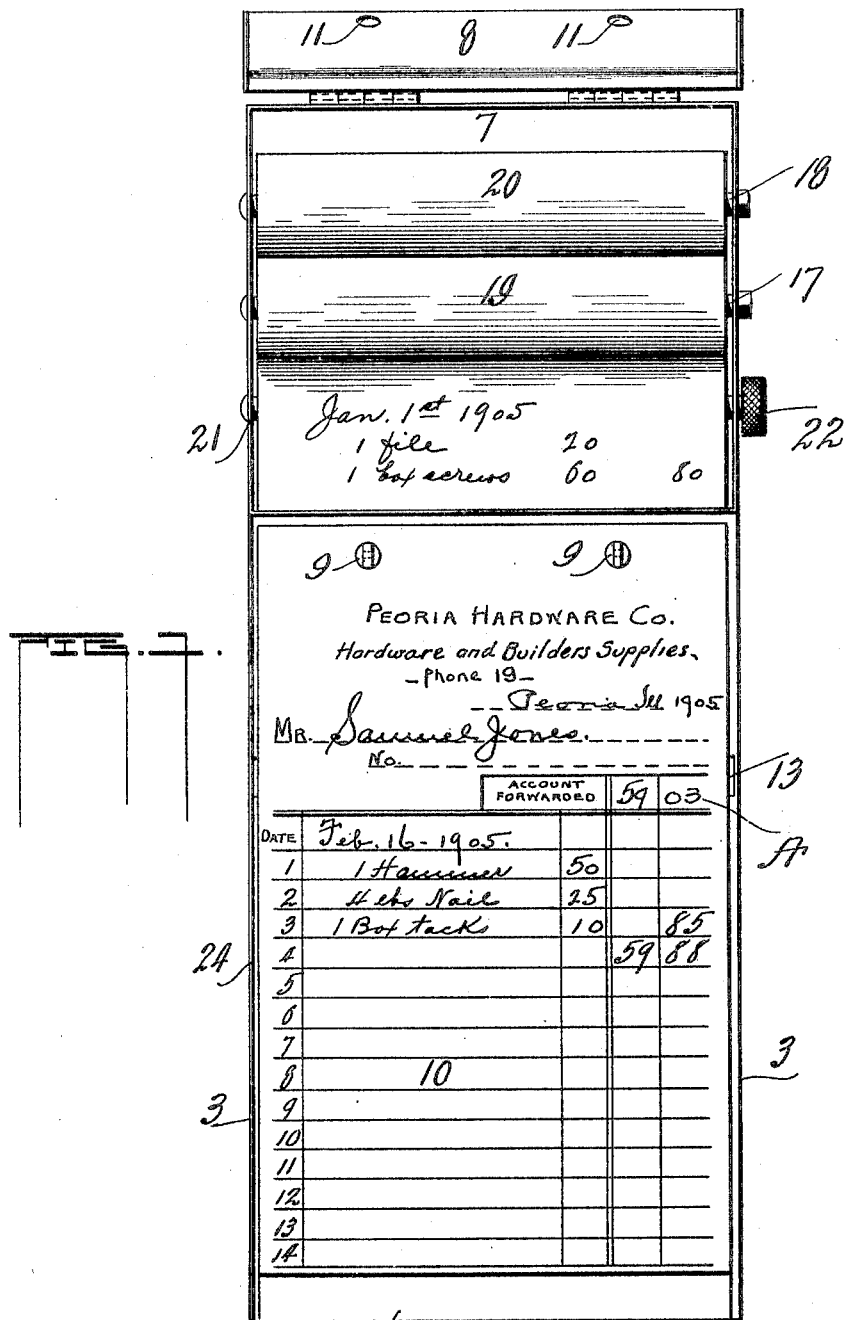

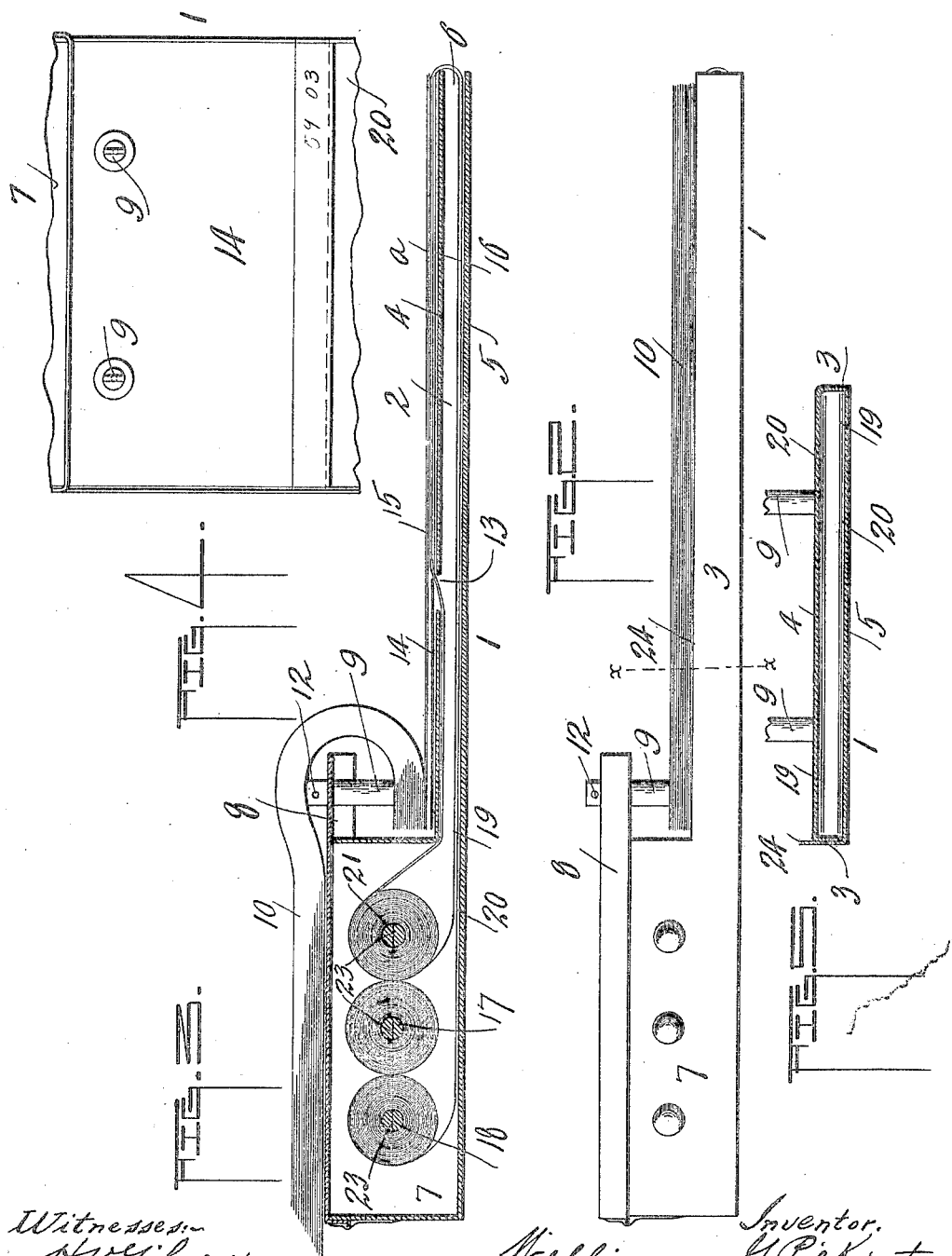

WILLIAM G. PILKINTON, OF SPRINGFIELD, ILLINOIS.

AUTOGRAPHIC REGISTER.

No. 802,406.          Specification of Letters Patent.          Patented Oct. 24, 1905.

Application filed February 20, 1905. Serial No. 246,473.

*To all whom it may concern:*

Be it known that I, WILLIAM G. PILKINTON, a citizen of the United States, residing at Springfield, in the county of Sangamon and State of Illinois, have invented certain new and useful Improvements in Autographic Registers; and I do hereby declare that the following is a full, clear, and exact description of the invention, which will enable others skilled in the art to which it appertains to make and use the same.

This invention has reference to a machine for making duplicate copies of writing, whether of sales-slips for use in stores or business memoranda of various kinds.

The invention pertains to that class of machines known as "autographic registers;" and the object which I have in view is to provide a series of sales-slips in the form of a writing-tablet and duplicate record-sheets drawn from feed-rolls and passed beneath the tablet to a storage-roll, upon which the same is wound, there being further provided transfer-paper between the bottom sheet of the tablet and the top sheet of the duplicate record-slip, and a transfer-sheet beneath the bottom of the second record-sheet.

A further object of the invention is an autographic register wherein entries are made upon the sales-slips starting from the bottom of the tablet and providing a duplicate and triplicate sheet movable beneath the last sheet of the tablet and adapted to be wound together on a storage-roll.

The invention has for its further object details to be hereinafter more particularly specified, and illustrated in the accompanying drawings, in which—

Figure 1 is a plan view of a machine embodying my improvements with the cover of the case containing the feed and storage rolls thrown back. Fig. 2 is a side elevation looking at one side of the machine. Fig. 3 is a longitudinal section through the machine, with the greater portion of the writing-tablet thrown back to illustrate that the slips of the tablet are used from the bottom up instead of from the top down. Fig. 4 is a plan view of a portion of the machine with the tablet removed, illustrating certain details; and Fig. 5 is a cross-section on the line *x x* of Fig. 2, omitting the pad, upper carbon-sheet, and transparent plate.

Referring to the drawings, the casing which contains the feed and storage rolls, also the sales-slips or tablet, is indicated as 1. The said casing is provided with the elongated flat hollow portion 2, having side walls 3, top and bottom walls 4 and 5, with an open end 6. At the head end of the casing the same is provided with a retaining-chamber 7, communicating with the portion 2 and provided with a hinged cover 8, by means of which access is had to the feed and storage rolls to be described.

Extending up from the top wall 4 of the portion 2 of the casing is shown a pair of stems or studs 9, disposed adjacent to the front wall of the chamber 7, and while serving to retain the sales-slips of a tablet 10 also serves as a lock for the hinged cover 8, which is provided with suitable perforations 11, through which the stems 9 project when the cover is closed and retained by pins 12 or other suitable means. The tablet 10 in Fig. 1 overlies the greater portion of the portion 2 of the casing, and in Fig. 3 all but the lower slip thereof, which is indicated as *a*, is thrown back over the retaining-chamber 7 to illustrate the mode of making out a sales-slip.

The top wall 4 at a suitable point is provided with a transverse slotted opening 13 of suitable width for a purpose to be described, and overlying that portion of the top wall 4 to and covering most of the opening 13 is a plate of transparent material 14, which is preferably held by the stems 9, the purpose of the plate 14 being further described in connection with the record sheets or strips to be described.

Retained in position by means of the studs or stems 9 and overlying the top wall 4, as well as the transparent plate 14, is a transfer or carbon sheet 15, being in length to correspond to the length of the sales-slips of the tablet 10, and 16 denotes a second sheet of transfer or carbon paper, which may be pasted or otherwise suitably secured to the top wall 4 of the portion 2 and extending from the open end 6 to the transverse opening 13 thereof.

Referring to the retaining-chamber 7, there is revolubly mounted therein a pair of feed-rolls 17 and 18, from which may be drawn continuous record-strips 19 and 20, which after they leave the feed-rolls overlie each other and are drawn through the hollow portion 2 of the casing, out through the open end 6 thereof, and up over the top wall 4 and above the carbon-sheet 16 attached thereto. The strip 20, as will be seen, is movable beneath the carbon-sheet 15, and the strip 19, as was indicated, is movable over the carbon-sheet 16. The said strips 19 and 20 are directed through the transverse opening 13 in the casing beneath the end of the transparent plate 14 and to and around a storage-roll 21, revolubly disposed in the chamber 7 in advance of the rolls 17 and 18. To operate the storage-roll for the purpose of advancing and taking up the record-strips 19 and 20, the storage-roll is provided with a finger-hold 22 upon the outside of the casing, as shown in Fig. 1. From the manner in which the manifolding is done on the record-strip 19 it might appear that this arrangement is impracticable and that the writing or record made would be inverted. However, it is to be noted that the record-strips are made of very light paper, so that the records made on the bottom of the strips may be easily read from the opposite side.

It will be understood that the sales-slips of the pad are provided with suitable perforations to adapt them to the stems 9, and the means herein shown for securing the strips 19 and 20 to the core of the feed and storage rolls is by slotting the said rolls in the manner shown, as at 23, in which the ends of the strips are inserted.

One of the walls 3, preferably the left-hand side of the device, is provided with an extension 24, forming a shield to protect and retain the edges of the sales-slips, record-strips, and carbon-sheets, which is apparent.

While the improvements herein are upon an autographic register and such machines have been used to keep copies of writing and of sales made without discrimination, it is understood that the same use of my machine may be made. However, particular attention is called to the fact that my register may be used as an individual register. In other words, a register of the character described may be assigned by a merchant to each of his customers, so that a continuous record of the purchases by a customer are kept by the merchant on, say, strip 20, while strip 19 at the end of the month is used by the same merchant as a monthly statement to be mailed or handed to the customer, which verifies the purchases indicated by the sales-slips of the tablet, which are handed to the purchaser after each purchase.

To illustrate more in detail the operation of the device, we will suppose that Jones is making a purchase and the register in Figs. 1, 2, and 3 is used to keep account of his purchases. As the merchant makes out his sales-slip, bearing in mind that he uses the bottom sheet always instead of the top, (see Fig. 3,) he first ascertains the balance, if there be any, shown on the strip 20, appearing as it does beneath the transparent plate 14, Fig. 4, where the strips 19 and 20 reënter the casing, and finding that his unpaid balance is fifty-nine dollars and three cents he enters the same on the sales-slip, as shown at A. The transparent plate, if of mica or other hard substance, serves as a backing for the sales-slip, as it is preferable to enter the balance on the sales-slip at a point above the transverse opening 13 in the casing. To ascertain what balance, if any, appears on the strip 20, the operator will necessarily have to raise the bottom sales-slip and the carbon-sheet 15, when he will be able to see through the plate 14 to the strip 20. The merchant enters the purchases made somewhat in the manner shown in Fig. 1, placing at the head of the sales the month and date, also indicated in Fig. 1. These entries are duplicated on the strips 19 and 20 through the agency of the carbon-sheets 15 and 16, arranged in the manner specified. The sale made, the sales-slip is torn off or detached and handed to the purchaser, when the strips 19 and 20 are rolled up on the storage-roll until the unpaid or paid balance appears beneath the transparent plate. (See Fig. 4.) As above suggested, at the end of the month the merchant will remove the storage-roll, disconnect the statement of the month's purchase, and mail or hand the same to the proper customer, retaining one for his own record. In this way the customer has handed to him a sales-slip at each purchase indicating the items of his purchase, while the merchant has a verified and itemized account of all of the purchases, which are arranged in succession.

Having thus fully described my invention, what I claim, and desire to secure by Letters Patent of the United States, is—

In a device of the character described, the combination of a casing having a containing-chamber, an open end and a transverse slot in its upper wall; record-strips fed from feed-rolls revolubly supported in the containing-chamber, out through the open end of the casing, over a portion of the top of the casing and through the transverse slot to the containing-chamber; a series of sales-slips attached to the upper wall of the casing, and transfer-sheets so disposed between the bottom sales-slip and top of the casing as to duplicate on the record-strips all entries made on the sales-slips.

In testimony whereof I affix my signature in presence of two witnesses.

WILLIAM G. PILKINTON.

Witnesses:
   ROBT. N. McCORMICK,
   CHAS. W. LA PORTE.